May 21, 1963 O. O. GRUENZ, JR 3,090,942
NUMBER COMPARISON AND DISPLAY CIRCUITS
Filed Dec. 18, 1958
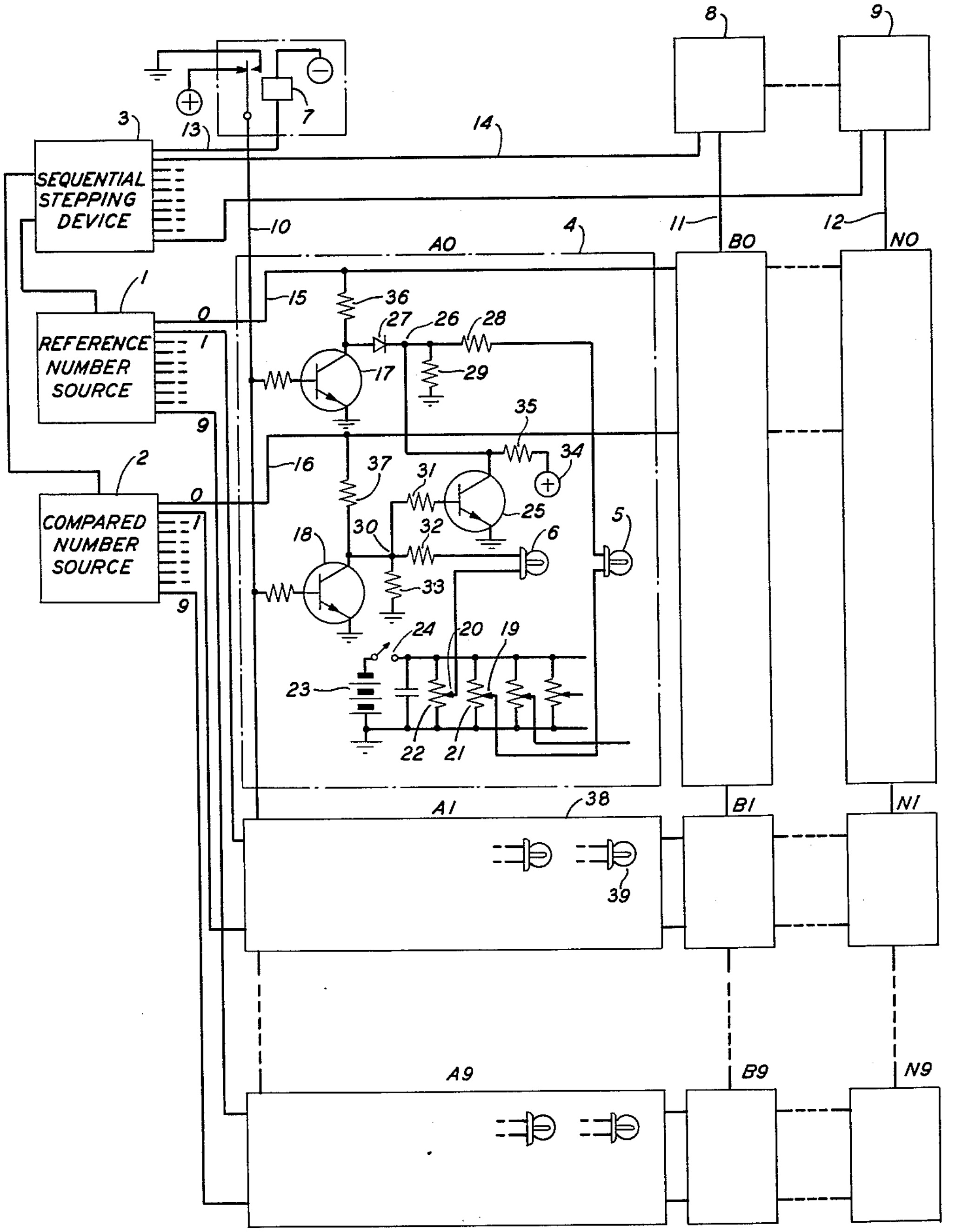
INVENTOR
O. O. GRUENZ, JR.
BY W. L. Keefauver
ATTORNEY United States Patent Office 3,090,942

Patented May 21, 1963

3,090,942

NUMBER COMPARISON AND DISPLAY CIRCUITS

Otto O. Gruenz, Jr., Livingston, N.J., assignor to Bell Telephone Laboratories, Incorporated, New York, N.Y., a corporation of New York Filed Dec. 18, 1958, Ser. No. 781,387
13 Claims. (Cl. 340—146.2)

This invention relates to comparison devices. Although the principles underlying the invention may find application in a variety of embodiments, the particular embodiment herein selected for an illustrative description comprises circuits which are effective to compare each digit in a multidigit number with each corresponding digit in another multidigit number and to display individually the results of each comparison by the lighting and extinguishing of information-representing indicating lamps.

Information comparison circuits are well known in the art, illustrative of which are those shown in FIGS. 7 and 8 of the United States Patent 2,981,806, granted on April 25, 1961, to J. K. Middaugh. Such circuits find utility not only in telephone switching and service-observing circuits but in computers and other types of data-handling apparatus. Although such circuits are widely employed, they do not in general provide a visual indication of data comparison results; and even where visual indication is provided, it is not individual with respect to the several elements in multielement items of information but is instead effective only to indicate whether or not a complete correspondence has occurred.

It is one general object of this invention to improve comparison display circuits.

It is another object of this invention to provide visual indication of the results of comparison of corresponding individual elements of information in multielement items and to present a continuing dislay of the value of the compared elements when agreement occurs.

It is yet another object of this invention to display continuing representations of the values of both the compared and comparing elements of information when such elements do not agree in order that the values of each may be preserved.

Consequently, in accordance with one feature of this invention, a plurality of indicating lights are arranged in pairs of columns with each column representing an element of information, with each different light within a column representing a different one of the possible values which the element may have, and with the two columns of a pair severally representing two elements which are to be compared.

In accordance with another feature of the invention, two transistors are interconnected through a third transistor to form a relatively simple and rapidly-responsive comparison circuit which is effective not only to effect a comparison of information elements but in addition to activate selectively a pair of indicating lights.

These and other objects and features of the invention will be apparent from the following description, by way of example, with reference to the drawing in which the single FIGURE depicts in schematic and block diagram form one elementary embodiment of the invention.

As the description proceeds, it will become apparent that the selected embodiment contemplates the presentation of information in decimal digit form, that each item of information is a decimal number, and that the elements of information are the several numerals which comprise the number. However, it will be apparent also that the principles underlying the invention could be readily adapted to other forms of expression without departing from the spirit or scope of the invention.

From a visual inspection of the figure, it will be seen that therein shown is a block representation of a reference number source 1, a similar representation of a compared number source 2, a representation of a sequential stepping device 3, and a matrix comprising a plurality of vertical columns A, B . . . N each having ten basic comparison circuits similar to those shown in detail within the A0 dashed rectangle 4.

The A column relates to the first (or A) digit in any number which is to be compared in the circuits, the B column to the next digit, the C column to the third digit . . . and the N column to the *n*th digit. The numbers 0–9 relate to the value of the digit and as will be observed from the figure, the embodiment herein described contemplates the use of information expressed in decimal form.

Each of the basic comparison circuits (for example, the circuits within dashed rectangle 4) contains two indicating lights, for example, neon lamps, 5 and 6. Accordingly, in the A column there will be two columns of indicating lights, one column being composed of ten lights corresponding to and including light 5, and the other column being composed of ten indicating lights corresponding to and including light 6. The first of these columns, i.e., that which contains light 5, relates to the first (or A) digit of the reference number; and the second of the columns, i.e., that which contains light 6, relates to the first (or A) digit of the compared number.

In addition to the previously-mentioned circuit elements appearing in the figure, it will be understood that there are included a plurality of relays corresponding to relay 7 which, although not specifically shown, are nevertheless intended to be included within the rectangles 8 . . . 9. These relays are effective, when suitably activated by the sequential stepping device 3, selectively to apply vertical column activating potentials to the vertical matrix leads 10 and 11 . . . 12. As will be presently seen, whenever the first digit of either a reference number or compared number is introduced to the equipment, the sequential stepping device 3 under control of either the reference number source 1 or the compared number source 2 applies ground to conductor 13 thereby operating relay 7 and applying ground via the front contacts thereof to the A column vertical matrix conductor 10.

The horizontal matrix conductors are twenty in number, ten which severally represent the ten possible values of a decimal digit in each reference numeral, and ten which severally represent the ten possible values for each compared number numeral. The uppermost (or 0) conductors which emerge from number sources 1 and 2 extend horizontally through each of the A0, B0 . . . N0 basic comparison circuits of the matrix. Similarly, the 1 leads extend horizontally through the A1–N1 basic circuits, the 2 leads extend horizontally through the A2–N2 basic circuits, and the 9 leads extend horizontally through the A9–N9 basic circuits.

The circuits herein described contemplate the introduction of all the digits of a reference number prior to the introduction of any one of the digits of the number to be compared. However, it will be apparent from the following description that if it were desired to introduce the B–N digits only after the preceding digits have been introduced and compared, the stepping device 3 could be modified to provide sequential stepping from one of the vertical columns of basic circuits to the next only after both digits relating to a given numerical position have been received. In such event, each pair of corresponding digits will be compared as the information is introduced, but the matrix circuits, including those similar to the circuits within dashed rectangle 4, will remain unchanged.

Now turning more specifically to the operation of the circuits, it may be assumed that reference number source 1 is any one of a wide variety of number sources such as, for example, punched paper tape, decimal registers, manually operated keys, etc., the particular type of which is unimportant to the invention. Similarly, compared number source 2 may be any one of a wide variety of number sources such as those mentioned above.

As stated before, it has been assumed that the reference number is presented in its entirety to the circuits prior to the introduction of any one of the compared digits. Accordingly, as each digit is introduced by the reference number source, the sequential stepping device transfers ground from one of its output conductors (for example, conductor 13) to the next conductor (for example, conductor 14). Initially, however, when the first numeral is presented by the reference number source, it finds the sequential stepping device in a state in which ground is applied to operate relay 7 via conductor 13.

Normally, when none of the vertical and horizontal matrix conductors is conditioned to an information-representing state, each of the column relays (corresponding to and including relay 7) is released and a modest positive potential is applied to the matrix vertical conductors 10 and 11 . . . 12. In addition, each of the ten reference number source horizontal conductors 0–9 and each of the ten compared number source horizontal conductors 0–9 are open circuited by apparatus (not shown) within the squares 1 and 2. When it is desired to condition a matrix vertical conductor to an information-representing state, the moderate positive potential is removed and the conductor is grounded. On the other hand, when it is desired to condition one of the horizontal leads to an information-representing state, a relatively high positive potential is applied thereto.

To aid in an understanding of the apparatus it may now be helpful to consider the operation of the basic circuit shown within rectangle 4 which, as previously mentioned, is repeated within the remaining rectangles A1–A9, B0–B9 . . . and N0–N9.

When no one of the three matrix leads passing through a given basic circuit is conditioned to an information-representing state, the three leads will reside in the electrical states mentioned above. Thus, for example, considering the circuits of rectangle 4, conductor 10 will be energized with a modest positive potential, and the 0 conductors 15 and 16 will be open circuited. Since the base of transistor 18 will be positive with respect to its emitter, the transistor will exhibit a relatively low impedance beween its emitter and collector. Consequently, its collector will reside substantially at ground potential. The collector of transistor 17 floats electrically, since conductor 15 is open circuited and asymmetrical current device 27 effectively isolates the collector from other external circuitry.

The importance of the states of the transistors resides in the effects they have upon the potentials existing at the upper terminals of the indicating lights 5 and 6. The lower terminals of the indicating lights are fed individually with negative potentials conducted from the taps 19 and 20 of voltage dividers 21 and 22, the undivided negative potential being derived from battery 23 via reset switch 24. The value of the potential at the lower terminal of indicating light 6, although sufficient to sustain conduction by the light when activated, is insufficient to cause initial ignition. On the other hand, the potential at the lower terminal of light 5 is insufficient even to sustain conduction.

An inspection of the drawing will reveal that the collector of transistor 25 is connected to the junction 26 of asymmetrical current device 27 and resistors 28 and 29. Accordingly, it might be expected that the condition of transistor 25 will influence the potential that may at any given time be present at the upper terminal of light 5.

Normally, when either the previously-mentioned positive potential is applied to the base of transistor 18 or conductor 16 is open circuited, the potential appearing at the junction 30 of resistors 31, 32, and 33 approximates that of ground. Consequently, transistor 25 resides in its high impedance state and the positive voltage provided by source 34 is impressed upon serially-connected resistors 35 and 29 which act as a voltage divider. Consequently, a part of the voltage appears at junction 26. Asymmetrical current device 27 acts to block any substantial attenuation that might otherwise occur as a result of shunting through the circuits of transistor 17, and this part of the voltage from source 34 therefore appears at the upper terminal of light 5. This voltage together with the negative potential conveyed to the lower terminal of light 5 is sufficient to sustain conduction but not to initiate it. It will thus be seen that in order for the light 6 to be activated, it is requisite that positive potential be applied to the upper terminal thereof; whereas in order for light 5 to be activated it is requisite that additional positive potential, over and above that supplied from source 34, be applied to its upper terminal.

The effect of enabling the A digit column by operating relay 7 will now be considered. When relay 7 is operated, the heretofore-mentioned moderate positive potential is removed from conductor 10 and the conductor is grounded at the contacts of the relay. Since the emitters of transistors 17 and 18 are grounded, these transistors are switched to their high impedance states thereby effectively disconnecting the emitters from their respective collectors. No noticeable change in the potentials at the upper terminals of the indicating lamps 5 and 6 occurs, however, because the transistor collectors remain near ground potential by virtue of the aforementioned open circuit condition of conductors 15 and 16.

If instead of being actuated, relay 7 remains unoperated, and the previously-mentioned relatively high positive potential is applied by the reference number source 1 to conductor 15, no appreciable change in the potential at the upper terminal of light 5 will occur because transistor 17 will be in its conducting state and most of the relatively high positive potential will be dissipated as a voltage drop across resistor 36. Similarly, if relay 7 is unoperated when relatively high positive potential is applied to conductor 16, little or no change takes place in the voltage at the collector of transistor 18, again because the applied potential appears almost wholly as a voltage drop across resistor 37. However, if the positive potentials are applied while relay 7 is actuated, the potentials at the upper terminals of lights 5 and 6 are changed sufficiently to result in activation thereof.

Normally, it might be expected that a reference digit would be introduced into the circuits before the corresponding compared digit. Consequently, positive potential would be applied to conductor 15 in advance of potential application to conductor 16. When, while relay 7 is operated, the previously-mentioned relatively high potential is applied to conductor 15, it is conducted with little attenuation via resistor 36, asymmetrical current device 27, and resistor 28 to the upper terminal of light 5. Since transistor 17 is in its cut-off state, it does not shunt the path, and since conductor 16 is open circuited, the voltage at the base of transistor 25 is insufficient to bias transistor 25 into a low impedance condition. Therefore, transistor 25 does not shunt the previously traced path from conductor 15 to light 5.

The relatively high potential conducted to the upper terminal of light 5 is sufficient (when added to the negative potential appearing at the lower terminal of the light) to initiate conduction and a resulting glow. Once conduction has begun, it will continue as long as transistor 25 remains in its high impedance state or until reset switch 24 is opened, for the potential from source 34, when not shunted to ground by transistor 25, is sufficient in aiding the previously-mentioned negative voltage to retain light 5 in its conducting state.

Now if it may be assumed that sometimes subsequently the corresponding compared digit is introduced, relay 7 will be operated; and if it may be assumed that a match occurs, a relatively high potential will be extended via conductor 16 and resistor 37 to the collector of transistor 18. If transistor 18 were conducting, the potential would be almost wholly dissipated across resistor 37. However, since relay 7 is actuated, transistor 18 is in its high impedance state, and the potential passes almost undiminished to both the base of transistor 25 and to the upper terminal of light 6. Light 6 is activated by this potential added to the previously-mentioned negative voltage derived from voltage divider 22.

At transistor 25, the positive voltage impressed on the base forward-biases the emitter junction thereby lowering the collector-to-emitter impedance to a very low value. Consequently, the voltage at junction 26 approaches ground, the remaining potential across light 5 is insufficient to sustain conduction, and the light is extinguished.

When the potential on conductor 16 reverts to zero, transistor 25 is changed back to its high impedance state. However, no change in the conditions of the lights takes place, light 5 remaining extinguished and light 6 remaining lit. Light 6, together with any other activated light in the array may be extinguished by opening the reset switch 24.

If, instead of there having been a match, there had been a dissimilarity, the light 5 would have remained lit and a light corresponding to light 6 but located in one of the rectangles A1–A9 would have been activated. Thus, for example, if the compared digit had been a 1 instead of 0, conductor 16 would have been left open circuited, the potential at the upper terminal of light 6 would not have been raised to cause light 6 to initiate conduction, and transistor 25 would have remained in its high impedance state thereby leaving unaffected the potentials requisite to the continued conduction of current by light 5. In rectangle 38, the light corresponding to light 6, i.e., light 39, would have been lit to indicate the number 1. Consequently, when corresponding digits do not match, both of the lights which severally represent the reference and compared digits remain lit to preserve visual indications of the values thereof.

It should now be apparent that under control of the sequential stepping device 3, the column-activating relays 7 and 8 . . . 9 sequentially enable the columns one at a time, and that the reference and compared number sources 1 and 2 operate in cooperative association with the column-activating relays to provide activating potentials which are selectively impressed upon the horizontal matrix conductors to represent values of the digits which are to be compared. Thus, selected ones of the basic comparison circuits are activated to display continuing visual indications of the values of the digits and the results of comparison.

While I have illustrated my invention by a particular embodiment thereof, the invention is not limited in its application to the specific apparatus and particular arrangement herein disclosed. Various applications, modifications, and arrangements of the invention will readily occur to those skilled in the art.

The terms and expressions which I have employed in reference to the invention are used as terms of description and not of limitation, and I have no intention in the use of such terms and expressions of excluding equivalents of the features shown and described or parts thereof, but on the contrary, intend to include therein any and all equivalents, modifications, and adaptations which may be employed without departing from the spirit of the invention.

What is claimed is:

1. Apparatus comprising a first pair of indicating devices each representing an identical item of information, a second pair of indicating devices both representing a different item of information, each of said first and said second pair of indicating devices being initially inactive, a first source of information, a second source of information, a first means connecting said first source of information to one indicating device of said first pair and to one indicating device of said second pair, a second means connecting said second source of information to the other indicating device of said first pair and to the other indicating device of said second pair, means including said first means responsive to the receipt of a predetermined item of information from said first source of information for activating said one indicating device of said first pair, and means including said second means responsive to the receipt of an information item from said second source of information when said information item corresponds to said predetermined item of information for activating said other indicating device of said first pair and for deactivating said one indicating device of said first pair.

2. Apparatus comprising a first pair of indicating devices each representing an identical item of information, a second pair of indicating devices both representing a different item of information, each of said first and said second pair of indicating devices being initailly inactive, a first source of information, a second source of information, a first means connecting said first source of information to one indicating device of said first pair and to one indicating device of said second pair, a second means connecting said second source of information to the other indicating device of said first pair and to the other indicating device of said second pair, means including said first means responsive to the receipt of a predetermined item of information from said first source of information for activating said one indicating device of said first pair, control means including said second means responsive to the receipt of an information item from said second source of information when said information item corresponds to said predetermined item of information for activating said other indicating device of said first pair, said last-mentioned means being responsive to the receipt of said information item when said information item and said predetermined item disagree for retaining said other indicating device of said first pair in an inactivated state, and means activated by said control means for deactivating said one indicating device of said first pair when said other indicating device of said first pair is activated.

3. Apparatus comprising a first pair of electrical elements each representing an identical item of information, a second pair of electrical elements both representing a different item of information, each of said first and said second pair of electrical elements being initially inactive, a first source of information, a second source of information, a first means connecting said first source of information to one element of said first pair and to one element of said second pair, a second means connecting said second source of information to the other element of said first pair and to the other element of said second pair, means including said first means responsive to the receipt of a first predetermined item of information for activating said one element of said first pair and responsive to the receipt of a second predetermined item of information for activating said one element of said second pair, and means including said second means responsive to the receipt of an item of information when said an item corresponds to said first predetermined item for activating said other element of said first pair and for deactivating said one element of said first pair, said last-mentioned means being responsive to the receipt of an item of information when said an item corresponds to said second predetermined item of information for leaving activated said one element of said first pair and for activating said other element of said second pair.

4. Apparatus comprising a first plurality of indicating devices each representing a different one of a first plurality of values expressible by a first digit, a corresponding plurality of indicating devices each representing a different one of a plurality of values expressible by a second digit and severally corresponding to the values of said first plurality of values, each of said first and said corresponding plurality of indicating devices being initially inactive, a first plurality of conductors in combinations selectively representing the values expressible by said first digit, a second plurality of conductors including certain of said first plurality of conductors in other combinations selectively representing the values expressible by said second digit, means for selectively activating said conductors in any of said combinations, means responsive to the activation of any combination of said first plurality of conductors for activating the corresponding one of said first plurality of indicating devices, means responsive to the activation of any combination of said second plurality of conductors for activating the corresponding one of said corresponding plurality of indicating devices, and means activated by said last-mentioned means for deactivating the activated corresponding one of said first plurality of indicating devices when said one of said corresponding plurality of indicating devices is activated.

5. Apparatus comprising a first plurality of indicating devices each representing a different one of a first plurality of values expressible by a first digit, a corresponding plurality of indicating devices each representing a different one of a plurality of values expressible by a second digit and severally corresponding to the values of said first plurality of values, each of said first and said corresponding plurality of indicating devices being initially inactive, a first plurality of conductors in combinations selectively representing the values expressible by said first digit, a second plurality of conductors including certain of said first plurality of conductors in other combinations selectively representing the values expressible by said second digit, means for selectively activating said conductors in any of said combinations, means responsive to the activation of any combination of said first plurality of conductors for activating the corresponding one of said indicating devices, means responsive to the activation of any combination of said second plurality of conductors for activating the corresponding one of said corresponding plurality of indicating devices, and means effective when said any combination of said second plurality of conductors represents the value expressed by said any combination of said first plurality of conductors for deactivating the corresponding indicating device of said first plurality.

6. Digit comparison circuits comprising a first plurality of indicating devices arranged in subpluralities in files each referable to a different digit position in a multidigit number, each of the indicating devices in a subplurality being representative of a different one of the possible values of the digit which may occupy the position to which said subplurality is referable, a first source of multidigit numbers, means connecting said first source to said first plurality of indicating devices responsive to the receipt of a multidigit number from said first source for selectively activating the indicating devices representing the values of the digits in said number from said first source, a second plurality of indicating devices arranged in other subpluralities in files each referable to a different digit position in another multidigit number, each of the indicating devices in each of said other subpluralities being representative of a different one of the possible values of the digit which may occupy the position to which said each of said other subpluralities is referable, a second source of multidigit numbers, means connecting said second source to said second plurality of indicating devices responsive to the receipt of a multidigit number from said second source for selectively activating the indicating devices representing the values of the digits in said multidigit number from said second source, and means for individually comparing the digits in each said different digit position and when the digits in any digit position correspond for deactivating in said any digit position the indicating device of said first plurality of indicating devices.

7. Apparatus comprising a first and a second transistor, a first and a second indicating lamp, first means interconnecting said first transistor with said first indicating lamp, second means interconnecting said second transistor with said second indicating lamp, means including said first interconnecting means and said first transistor responsive to the receipt of a first selected signal at said first transistor for lighting said first indicating lamp, a third transistor interconnecting said first transistor with said second transistor, means including said second interconnecting means and said second transistor responsive to the receipt of a second selected signal at said second transistor for lighting said second indicating lamp, and means including said third transistor for extinguishing said first indicating lamp when both said first and said second indicating lamps are lighted.

8. Apparatus comprising a first source of information, a second source of information, a first plurality of elements capable of being each separately triggered from a first stable electrical state to a second stable state and each representing a different item of information, a second plurality of elements capable of being each separately triggered from a first stable electrical state to a second stable state and each representing a different item of information, each of said first and said second plurality of elements being initially in the same stable electrical state, means connecting said first source of information to said first plurality of elements for triggering that element representing the item of information supplied by said source from said first to said second state, means connecting said second source of information to said second plurality of elements for triggering that element representing the item of information supplied by said source from said first to said second state, and means interconnecting said first plurality of elements and said second plurality of elements for triggering that element of said first plurality in said second state back to said first state if said items of information from said first and second sources correspond.

9. Information comparison circuits comprising a first source of information, a second source of information, a first element capable of assuming two different electrical states, a second element capable of assuming two different electrical states, said first and said second element being both initially in the same one of said two different states, a first means interconnecting said first source of information and said first element, said first means being responsive to the receipt of a predetermined item of information from said first source for triggering said first element from a first to a second electrical state, a second means interconnecting said second source of information and said second element, said second means being responsive to the receipt of a predetermined item of information from said second source for triggering said second element from a first to a second electrical state, and means interconnecting said first element and said second element for causing said first element to change its electrical state from said second state back to said first state if said predetermined items of information from said first and second sources correspond.

10. Apparatus comprising a first pair of indicating devices each representing an identical item of information, a second pair of indicating devices both representing a different item of information, each of said first and said second pair of indicating devices being initially inactive, a first source of information, a second source of information, a first means connecting said first source of information to one indicating device of said first pair and to one indicating device of said second pair, a second means connecting said second source of information to the other indicating device of said first pair and to the other indicating device of said second pair, means including said first means responsive to the receipt of a predetermined item of information from said first source of information for activating said one indicating device of said first pair, and means including said second means responsive to the receipt of an information item from said second source of information when said information item corresponds to said predetermined item of information for activating said other indicating device of said first pair and for deactivating said one indicating device of said first pair, said last-mentioned means being responsive to the receipt of said information item when said information item and said predetermined item disagree for retaining said one indicating device of said first pair in an activated state and for activating said other indicating device of said second pair if said information item is that item of information that said second pair of indicating devices is intended to represent.

11. Information comparison circuits comprising a first source of information, a second source of information, first means including a first element coupled to said first information source and capable of assuming more than one electrical state, second means including a second element coupled to said second information source and capable of assuming more than one electrical state, each of said first and second elements being initially in the same electrical state, said first means responsive to the receipt of a predetermined item of information from said first source for causing said first element to assume an electrical state corresponding to said information item from said first source, said second means responsive to the receipt of an item of information from said second information source for causing said second element to assume an electrical state corresponding to said item of information from said second source, and means interconnecting said first means and said second means for rendering said first element electrically ineffective to assume said electrical state corresponding to said item of information from said first source if said predetermined item and said item of information from said second source of information correspond.

12. Apparatus comprising a first and a second transistor, a first and a second indicating lamp, first means interconnecting said first transistor with said first lamp, second means interconnecting said second transistor with said second lamp, said first and said second lamp being initially extinguished, third means including said first means and said first transistor responsive to the receipt of a first selected signal at said first transistor for lighting said first lamp, fourth means including said second means and said second transistor operable in response to the receipt of a second selected signal at said second transistor for lighting said second lamp, and fifth means interconnecting said first and said second transistor for rendering said fourth means inoperative to prevent the lighting of said second lamp when said first lamp is lit.

13. Apparatus comprising a pair of indicating devices each representing an identical item of information, each of said indicating devices of said pair being initially inactive, a first source of information, a second source of information, first means connecting said first information source to one of said pair of devices, second means connecting said second information source to the other device of said pair, third means including said first means responsive to the receipt of a predetermined item of information from said first information source for activating said one device of said pair, fourth means including said second means operable in response to a predetermined item of information from said second source for activating said other device of said pair, and means controlled by said third means for rendering said fourth means inoperative to prevent the activation of said other device of said pair only when said predetermined item of information from said second information source is identical with said predetermined item of information from said first information source.

References Cited in the file of this patent

UNITED STATES PATENTS

| | | |
|---|---|---|
| 2,612,551 | Kreiner | Sept. 30, 1952 |
| 2,712,898 | Knutson | July 12, 1955 |
| 2,785,856 | Hobbs | Mar. 19, 1957 |
| 2,959,768 | White et al. | Nov. 8, 1960 |

OTHER REFERENCES

Publication: High Speed Computing Devices, by Engineering Research Associates, published by McGraw-Hill Book Co., Inc., New York, 1950, pp. 15–19 relied on.